United States Patent
You et al.

(10) Patent No.: US 9,445,167 B2
(45) Date of Patent: Sep. 13, 2016

(54) PERSISTENT SCHEDULING METHOD AND APPARATUS BASED ON SEMI-GROUPING AND STATISTICALLY MULTIPLEXING

(75) Inventors: Mingli You, Shanghai (CN); Yan Zhao, Shanghai (CN); Tao Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1173 days.

(21) Appl. No.: 12/810,964

(22) PCT Filed: Dec. 29, 2007

(86) PCT No.: PCT/CN2007/003956
§ 371 (c)(1),
(2), (4) Date: Jun. 28, 2010

(87) PCT Pub. No.: WO2009/086667
PCT Pub. Date: Jul. 16, 2009

(65) Prior Publication Data
US 2010/0284292 A1    Nov. 11, 2010

(51) Int. Cl.
*H04Q 11/04* (2006.01)
*H04L 1/18* (2006.01)
*H04L 1/00* (2006.01)
*H04W 72/04* (2009.01)

(52) U.S. Cl.
CPC ............ *H04Q 11/04* (2013.01); *H04L 1/1887* (2013.01); *H04W 72/048* (2013.01); *H04L 1/0003* (2013.01); *H04L 1/0009* (2013.01); *H04L 1/0015* (2013.01); *H04Q 2213/1309* (2013.01); *H04Q 2213/13034* (2013.01); *H04Q 2213/13288* (2013.01); *H04Q 2213/13292* (2013.01); *H04Q 2213/13367* (2013.01); *H04Q 2213/13389* (2013.01); *H04Q 2213/13392* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 6,480,505 B1* | 11/2002 | Johansson | H04W 72/121 370/329 |
| 7,085,256 B2* | 8/2006 | Ware | H04W 72/1278 370/336 |
| 7,280,609 B2* | 10/2007 | Dottling | H03M 5/00 375/295 |

(Continued)

FOREIGN PATENT DOCUMENTS

| | | |
|---|---|---|
| EP | 1 641 288 | 3/2006 |
| WO | WO 2007/124675 | 11/2007 |
| WO | WO 2008/130156 | 10/2008 |

OTHER PUBLICATIONS

"VoIP Group Scheduling", 3GPP TSG RAN WGI #44, Denver, US, Feb. 13-17, 2006.

(Continued)

*Primary Examiner* — Andrew Oh
(74) *Attorney, Agent, or Firm* — Fay Sharpe, LLP

(57) ABSTRACT

A persistent scheduling method and apparatus based on semi-grouping and statistically multiplexing, wherein a predetermined number of user equipments are grouped into a user equipment group to share allowable maximum transmission times of retransmission processes in different time slots each having a predetermined size, according to a predetermined set of criteria on communication conditions; and each user equipment within one user equipment group is allocated to use a corresponding time slot in a time division multiplexing mode.

10 Claims, 7 Drawing Sheets

(56) References Cited

U.S. PATENT DOCUMENTS

| | | | | |
|---|---|---|---|---|
| 7,616,610 B2* | 11/2009 | Kuchibhotla | ....... | H04W 72/005 370/310 |
| 7,715,311 B2* | 5/2010 | Herrmann | ............ | H04L 1/1819 370/226 |
| 8,346,256 B2* | 1/2013 | Brueck | ................ | H04L 12/189 455/435.3 |
| 8,416,872 B2* | 4/2013 | Higuchi | ............... | H04B 7/0669 375/267 |
| 2002/0122383 A1* | 9/2002 | Wu | ...................... | H04B 7/0417 370/210 |
| 2002/0168940 A1* | 11/2002 | Heijenk et al. | ................. | 455/41 |
| 2003/0076842 A1* | 4/2003 | Johansson | ............... | H04L 12/24 370/401 |
| 2004/0121788 A1* | 6/2004 | Moon | ................... | H04L 1/0009 455/502 |
| 2004/0221218 A1* | 11/2004 | Grob | .................... | H04B 7/2656 714/748 |
| 2005/0002372 A1* | 1/2005 | Rune | ..................... | H04W 74/06 370/346 |
| 2005/0063345 A1* | 3/2005 | Wu et al. | ....................... | 370/335 |
| 2006/0062167 A1* | 3/2006 | Golitschek et al. | .......... | 370/293 |
| 2006/0105798 A1* | 5/2006 | Ghosh et al. | ................. | 455/522 |
| 2006/0125689 A1* | 6/2006 | Narayan | ................. | G01S 19/21 342/381 |
| 2007/0002786 A1* | 1/2007 | Herrmann | ............ | H04L 1/1819 370/328 |
| 2007/0135125 A1* | 6/2007 | Kim | ..................... | H04B 1/7105 455/436 |
| 2007/0177555 A1* | 8/2007 | Brueck | ................ | H04L 12/189 370/338 |
| 2007/0223422 A1* | 9/2007 | Kim | ..................... | H04B 7/0417 370/334 |
| 2007/0230412 A1 | 10/2007 | McBeath et al. | | |
| 2007/0258540 A1* | 11/2007 | Ratasuk | ................. | H04J 11/005 375/267 |
| 2008/0025247 A1* | 1/2008 | McBeath | ............ | H04W 74/002 370/321 |
| 2008/0056125 A1* | 3/2008 | Kneckt | ................... | H04L 12/24 370/229 |
| 2008/0062936 A1* | 3/2008 | He | ........................ | H04W 72/12 370/338 |
| 2008/0090583 A1* | 4/2008 | Wang | ................... | H04W 72/121 455/452.1 |
| 2008/0151801 A1* | 6/2008 | Mizuta | ................ | H04W 52/343 370/311 |
| 2009/0003468 A1* | 1/2009 | Karabulut | ............. | H04L 5/0007 375/260 |
| 2009/0022098 A1* | 1/2009 | Novak | ...................... | H04L 1/14 370/329 |
| 2009/0040928 A1* | 2/2009 | Wang | .................... | H04L 1/1812 370/232 |
| 2009/0040970 A1* | 2/2009 | Ahmadi | ............... | H04B 7/2612 370/329 |
| 2009/0052392 A1* | 2/2009 | Sumasu et al. | ................. | 370/331 |
| 2009/0100276 A1* | 4/2009 | Rozen | ................... | G06F 1/3203 713/300 |
| 2009/0103927 A1* | 4/2009 | Cunningham | ..... | H04B 10/6971 398/139 |
| 2009/0180432 A1* | 7/2009 | Harada | ................. | H04L 1/0003 370/329 |
| 2009/0219873 A1* | 9/2009 | Higuchi | ................. | H04J 13/00 370/329 |
| 2009/0262653 A1* | 10/2009 | Toda | .................... | H04L 1/0026 370/252 |
| 2009/0279445 A1* | 11/2009 | Nogami | ................. | H04L 5/006 370/252 |
| 2009/0323541 A1* | 12/2009 | Sagfors | ................ | H04L 1/0015 370/252 |
| 2010/0042882 A1* | 2/2010 | Randall | ............... | H04L 12/1868 714/748 |
| 2010/0115363 A1* | 5/2010 | Seo | ........................ | H04L 1/1812 714/748 |
| 2010/0165953 A1* | 7/2010 | Chen | ................ | H04W 72/1273 370/335 |
| 2010/0220668 A1* | 9/2010 | Yamada | ................ | H04L 5/0007 370/329 |

OTHER PUBLICATIONS

"Persistent Scheduling and Group Scheduling for VoIP", 3GPP TSG-RAN2 Meeting #57, St. Louis, US, Feb. 12-16, 2007.
European Search Report.
International Search Report.

\* cited by examiner

PERSISTENT SCHEDULING METHOD AND APPARATUS BASED ON SEMI-GROUPING AND STATISTICALLY MULTIPLEXING

BACKGROUND OF THE INVENTION

1. Field of Invention

The present invention relates to the wireless communication field, and more particularly, to a persistent scheduling method and apparatus based on UE semi-grouping and statistically multiplexing.

2. Description of Prior Art

In Long Term Evolution (LTE) system, all services will be carried in packet domain and thus Voice over IP (VoIP) is an important service for operators. The scheduling is critical to improve the VoIP capacity. From current $3^{rd}$ Generation Partnership Project (3GPP) status on UpLink (UL) Scheduling principles [Reference 1], both persistent and dynamic scheduling modes for VoIP are allowed for LTE uplink.

For LTE system, it will support quite large number (e.g., 400) of active UEs. Then specifically for uplink, it will consume large number of grants to support a large number of VoIP users, which will reduce the downlink (DL) capacity.

With the constraints on dynamic grant method above, to save the downlink (DL) L1 capacity, dynamic scheduling mode isn't preferred for VoIP services. As a sequence, it becomes an issue to leverage the unused HARQ transmission for each HARQ process. In LTE system, low average transmission number will have high spectrum efficiency with adaptive modulation and coding schemes. Thus the average HARQ transmission number will be typically between 1 and 2 to achieve good spectrum efficiency. In other side, the maximum transmission number will be large (such as 4 or 5) for VoIP service and thus the system should at least allocate the resource for the potential retransmissions up to its maximum transmission number. There is no dynamic grant needed in persistent scheduling mode, however, how to sufficiently leverage the resource in HARQ transmission in persistent manner is still an open point.

To improve the resource utilization, there is a proposal from Motorola [Reference 2] to use dynamic grouping scheduling to group a number of VoIP users to share the resources. Different users should use same MCS and same resource units in one group and thus a number of groups can be defined with different MCS and RU (resource unit) number. However, this proposal needs specific bit-map dynamic grant to indicate which VoIP user in the group will use the time/frequency resource. This conflicts with current grant method in 3GPP and this proposal isn't selected in 3GPP now.

There is another proposal from Alcatel-Lucent [Reference 3] to share the HARQ resource with non-VoIP user. The basic idea is to let the dynamic users use the unused HARQ retransmission opportunities for VoIP (due to successfully transmission of the VoIP packet) to transmit other packet service and when there is a collision, the VoIP packet initial transmission is shifted in time domain. But in frequency-domain, the VoIP packet will use the same resource unit and same MCS. With this approach, the time resource for initial transmission isn't persistent and VoIP service and other dynamic packet services share the same frequency resource. This seems also not feasible from current 3GPP status and system design viewpoint in the case that there is different Bandwidth allocated to VoIP services and other burst services.

SUMMARY OF THE INVENTION

This basic idea of the present invention is to leverage the unused HARQ transmission opportunities in persistent scheduling mode for uplink VoIP scheduling using semi-grouping VoIP UEs and statistically multiplexing method among VoIP packets for same VoIP UE.

According to a first aspect of the present invention, there is provided a persistent scheduling method based on user equipment semi-grouping and statistically multiplexing, which comprises steps of: grouping a predetermined number of user equipments into a user equipment group to share allowable maximum transmission times of retransmission processes in different time slots each having a predetermined size, according to a predetermined set of criteria on communication conditions; and allocating each user equipment within one user equipment group to use a corresponding time slot in a time division multiplexing mode.

Preferably, the persistent scheduling method according to the present invention further comprises steps of: monitoring the communication conditions of all the user equipments periodically; determining whether or not the predetermined number of user equipments previously grouped into one user equipment group still satisfy the predetermined set of criteria on communication conditions, and determining whether or not another user equipment currently satisfies the predetermined set of criteria on communication conditions; and adjusting those user equipments not satisfying the predetermined set of criteria on communication conditions any longer out of the user equipment group, and adjusting those user equipments currently satisfying the predetermined set of criteria on communication conditions into the use equipment group.

Preferably, the predetermined set of criteria on communication conditions at least includes:
the user equipment is in a talk state;
the user equipment does not have a bad channel condition; and
those user equipments to be grouped into one user equipment group have similar channel conditions.

More preferably, if a measured average signal to interference plus noise ratio of a user equipment is lower than a first predetermined threshold, it is determined that the user equipment has a bad channel condition.

More preferably, if a maximum difference among measured average signal to interference plus noise ratios of a group of user equipments is smaller than a second predetermined threshold, it is determined that the group of user equipments have similar channel conditions.

Preferably, the persistent scheduling method according to the present invention further comprises a step of: allocating packets from one user equipment to share the allowable maximum transmission times of the retransmission processes within to the corresponding time slot allocated to the one user equipment.

More preferably, the persistent scheduling method according to the present invention further comprises steps of: retransmitting a packet from the one user equipment failed to be transmitted/retransmitted if at least one retransmission process is still possible within the corresponding time slot allocated to the one user equipment; and discarding the packet from the one user equipment failed to be transmitted/retransmitted and any other remained packets from the one user equipment if no retransmission process is possible within the corresponding time slot allocated to the one user equipment.

More preferably, frequency resource and a modulation coding scheme for the one user equipment are kept unchanged all the time.

Alternatively, frequency resource and a modulation coding schemes for the one user equipment are changed according to a measured signal to interference plus noise ratio of the one user equipment.

More preferably, the frequency resource are the number of resource units allocated to the one user equipment.

Preferably, for those grouped user equipments, the predetermined set of criteria on communication conditions further includes at least one of:
  an average packet error ratio of the user equipments in the user equipment group during a predefined measurement period is no larger than a first threshold; and
  an average used number of retransmission times in the one user equipment group is lower than a second threshold Preferably, for those non-grouped user equipments, the predetermined set of criteria on communication conditions further includes at least one of:
  an average packet error ratio of the user equipments in one user equipment group during a predefined measurement period is no larger than a first threshold; and
  an average used number of retransmission times in the one use equipment group is no larger than a third threshold.

According to a second aspect of the present invention, there is provided a persistent scheduling apparatus based on user equipment semi-grouping and statistically multiplexing, which comprises: a grouping means for grouping a predetermined number of user equipments into a user equipment group to share allowable maximum transmission times of retransmission processes in different time slots each having a predetermined size, according to a predetermined set of criteria on communication conditions; and an allocating means for allocating each user equipment within one user equipment group to use a corresponding time slot in a time division multiplexing mode.

Preferably, the persistent scheduling apparatus according to the present invention further comprises: a monitor for monitoring the communication conditions of all the user equipments periodically; a judger for determining whether or not the predetermined number of user equipments previously grouped into one user equipment group still satisfy the predetermined set of criteria on communication conditions, and for determining whether or not another user equipment currently satisfies the predetermined set of criteria on communication conditions; and an adjustor for adjusting those user equipments not satisfying the predetermined set of criteria on communication conditions any longer out of the user equipment group, and for adjusting those user equipments currently satisfying the predetermined set of criteria on communication conditions into the use equipment group.

Preferably, the predetermined set of criteria on communication conditions at least includes:
  the user equipment is in a talk state;
  the user equipment does not have a bad channel condition; and
  those user equipments to be grouped into one user equipment group have similar channel conditions.

More preferably, if a measured average signal to interference plus noise ratio of a user equipment is lower than a first predetermined threshold, it is determined that the user equipment has a bad channel condition.

More preferably, if a maximum difference among measured average signal to interference plus noise ratios of a group of user equipments is smaller than a second predetermined threshold, it is determined that the group of user equipments have similar channel conditions.

Preferably, the persistent scheduling apparatus according to the present invention further comprises: a retransmission process controller for allocating packets from one user equipment to share the allowable maximum transmission times of retransmission processes within the corresponding time slot allocated to the one user equipment.

More preferably, the retransmission process controller is further used to retransmit a packet from the one user equipment failed to be transmitted/retransmitted if at least one retransmission process is still possible within the corresponding time slot allocated to the one user equipment; and to discard the packet from the one user equipment failed to be transmitted/retransmitted and any other remained packets from the one user equipment if no retransmission process is possible within the corresponding time slot allocated to the one user equipment.

More preferably, the retransmission process controller keeps frequency resource and a modulation coding scheme for the one user equipment unchanged all the time.

Alternatively, the retransmission process controller changes frequency resource and a modulation coding schemes for the one user equipment according to a measured signal to interference plus noise ratio of the one user equipment.

More preferably, the frequency resource are the number of resource units allocated to the one user equipment.

Preferably, for those grouped user equipments, the predetermined set of criteria on communication conditions further includes at least one of:
  an average packet error ratio of the user equipments in the user equipment group during a predefined measurement period is no larger than a first threshold; and
  an average used number of retransmission times in the one user equipment group is lower than a second threshold Preferably, for those non-grouped user equipments, the predetermined set of criteria on communication conditions further includes at least one of
  an average packet error ratio of the user equipments in one user equipment group during a predefined measurement period is no larger than a first threshold; and
  an average used number of retransmission times in the one use equipment group is no larger than a third threshold.

In persistent scheduling mode, multiple VoIP UEs are semi-statically (using persistent grant) grouped to equally share the HARQ processes in different voice slot (20 ms) in time domain. Within each VoIP UEs, multiple VoIP packets are statistically sharing the HARQ process within each allocated time slot that each packet can have the chance reach maximum transmission number by casual and in meantime the multiple VoIP packets can be successfully transmitted in the shared HARQ process resource by average.

The advantage of semi-grouping for persistent scheduling is to significantly improve the system capacity without any dynamic signaling cost (~90% gain).

BRIEF DESCRIPTION OF THE DRAWINGS

The above and other objects, features and advantages of the present invention will be clearer from the following detailed description about the non-limited embodiments of the present invention taken in conjunction with the accompanied drawings, in which.

DETAILED DESCRIPTION OF PREFERRED EMBODIMENTS

Hereunder, the present invention will be described in accordance with the drawings. In the following description, some particular embodiments are used for the purpose of description only, which shall not be understood as any limitation to the present invention but the examples thereof. While it may blur the understanding of the present invention, the conventional structure or construction will be omitted.

1. VoIP Service Characteristics

Figure 1:
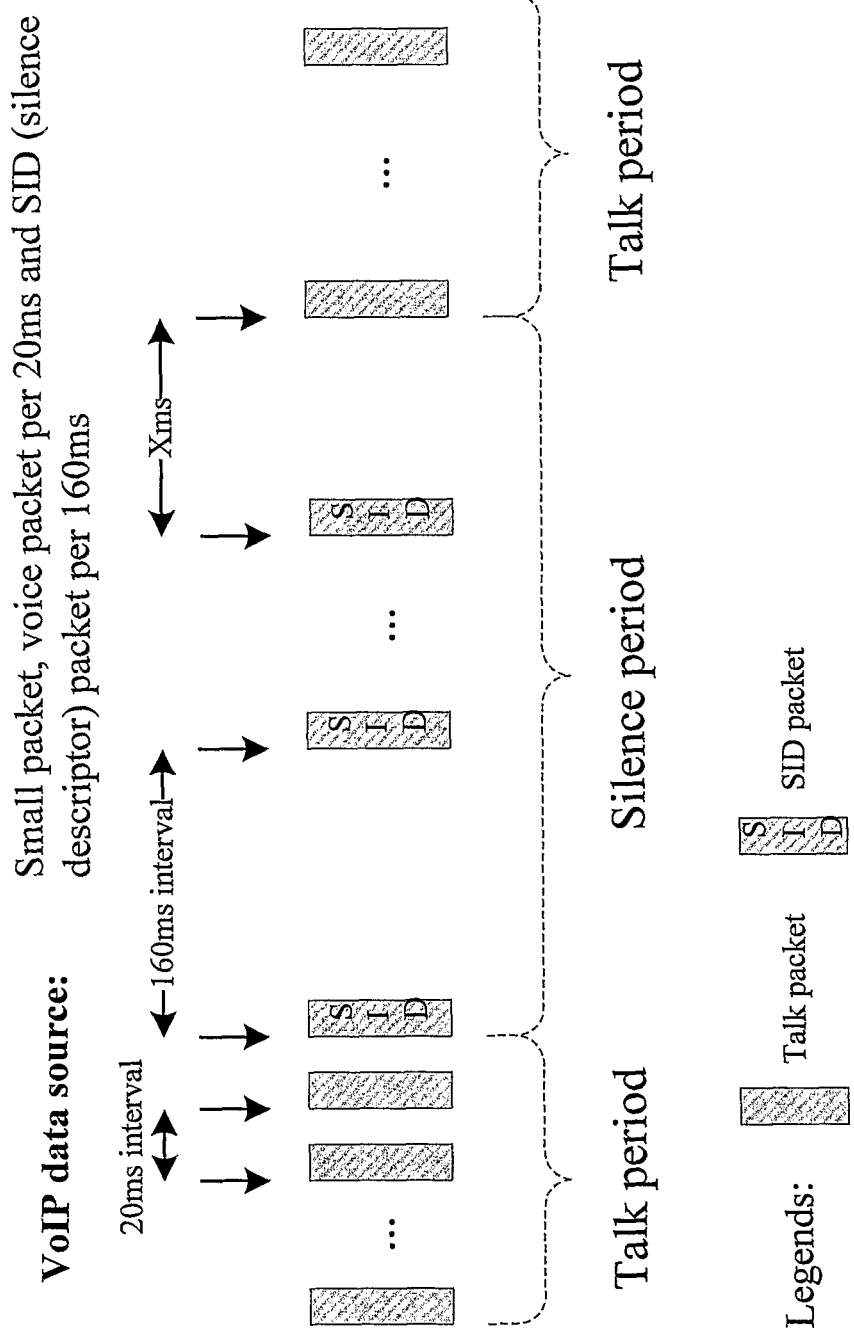
FIG. 1 is a schematic diagram to overview the characteristics of the VoIP service from VoIP data source.

For VoIP service, there are two states either talk state or silence state. In talk state, only one VoIP packet is transmitted every 20 ms; and in silence state, one SID (silence descriptor) packet is transmitted every 160 ms as shown in FIG. 1. In addition, the synchronous HARQ is supported for UL VoIP transmission.

2. Semi-Grouping Method for Persistent Scheduling Mode

Since there are a large number of VoIP users supported at the same time, persistent scheduling mode is a kind of choice for uplink VoIP service due to the benefits of no need for dynamic grant. The persistent scheduling mode will be used in the first release of LA0.1 within Alcatel-lucent product.

In persistent scheduling mode without dynamic downlink grant, it is impossible to leverage the unused HARQ transmission from another VoIP user since the L3 signaling is slow. The basic idea of semi-grouping is to let multiple frames in the same VoIP user share the HARQ process and then the unused HARQ retransmission opportunity for one VoIP packet can be used by another VoIP packet from the same VoIP user without any signaling cost. Different VoIP users can share the HARQ process resources in different frames (20 ms). Since Adaptive Modulation and Coding (AMC) is supported in LTE uplink, the typical average HARQ transmission number (e.g., 1~2) isn't high to achieve good spectrum efficiency. Thus it is most possibly to transmit two to three VoIP packets within one frame (20 ms). Thereafter, the HARQ resource utilization can be significantly improved with the semi-grouping method.

Figure 2A:
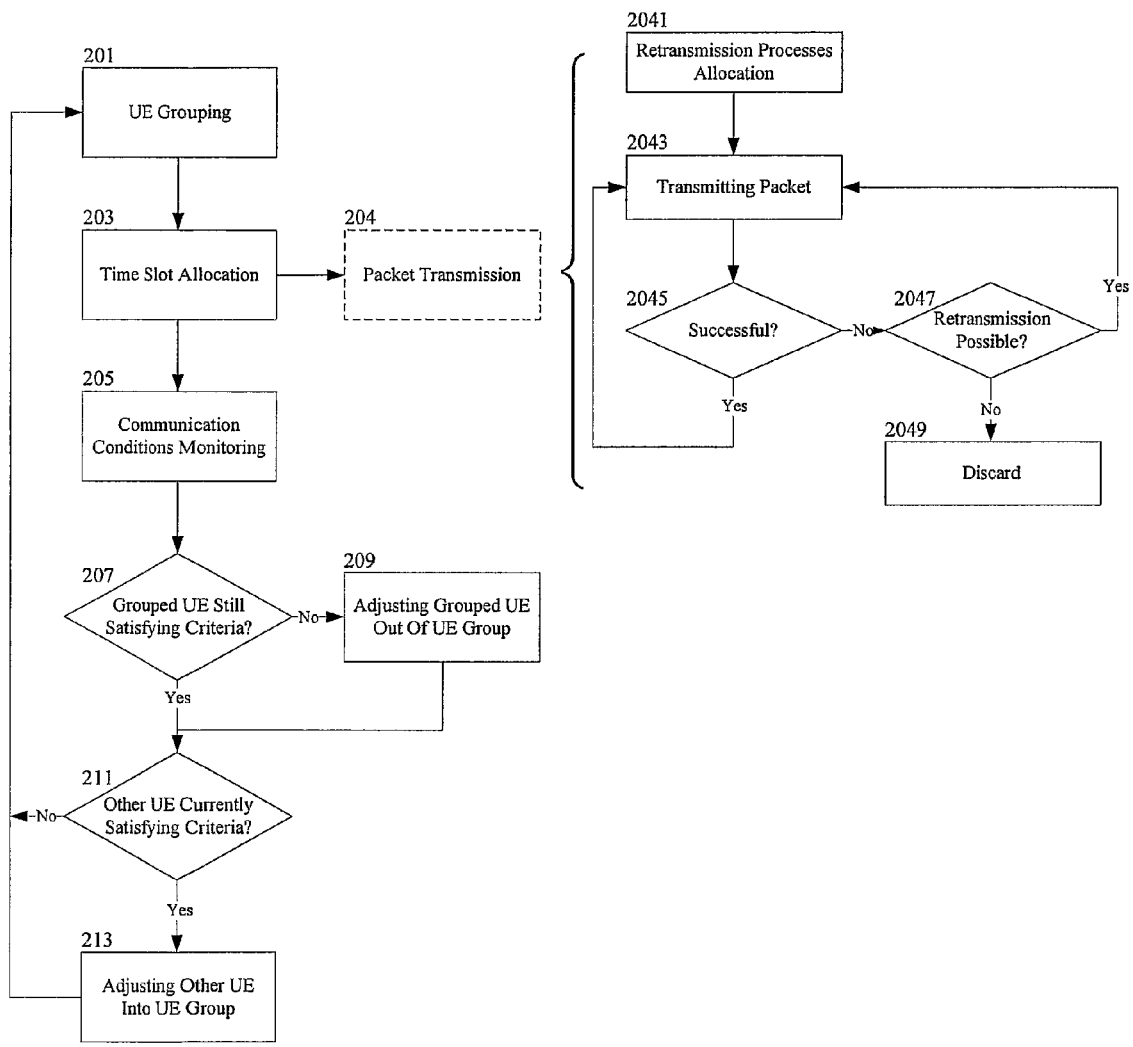
FIG. 2a shows a flowchart of the persistent scheduling method according to the present invention.

FIG. 2a shows a flowchart of the persistent scheduling method according to the present invention.

As shown in FIG. 2a, at step 201, a predetermined number of UEs are grouped into a UE group to share retransmission processes in different time slots each having a predetermined size, according to a predetermined set of criteria on communication conditions. Thereafter, at step 203, each UE within one UE group are allocated to use a corresponding time slot in a time division multiplexing (TDM) mode. Therefore, at step 204, each UE will use its corresponding time slot to transmit its packets. Step 204 will be described in details latter.

Furthermore, according to the present invention, at step 205, the communication conditions of all the UEs are monitored periodically. Then, at step 207, it is determined whether or not the predetermined number of UEs previously grouped into one UE group still satisfy the predetermined set of criteria on communication conditions. If it is determined at step 207 that some UEs do not satisfy the predetermined set of criteria on communication conditions any longer ("No" at step 207), then at step 209, those UEs not satisfying the predetermined set of criteria on communication conditions any longer are adjusted out of the UE group. Otherwise, if it is determined at step 207 that all UEs still satisfy the predetermined set of criteria on communication conditions and there is sufficient resource space (unused HARQ retransmission number is large than 2) in that UE group ("Yes" at step 207), then at step 211, it is determined whether or not another UE currently satisfies the predetermined set of criteria on communication conditions. If it is determined that some UEs currently satisfy the predetermined set of criteria on communication conditions ("Yes" at step 211), then at step 213, those UEs currently satisfying the predetermined set of criteria on communication conditions are adjusted into the use equipment group. After step 213, the process flow goes back to step 201 to update the UE groups if necessary. Otherwise, if it is determined that no other UEs currently satisfy the predetermined set of criteria on communication conditions ("No" at step 211), the process flow directly goes back to step 201 to update the UE groups if necessary.

According to the present invention, at step 201, the predetermined set of criteria on communication conditions at least includes:

the UE is in a talk state;
the UE does not have a bad channel condition; and
those UEs to be grouped into one UE group have similar channel conditions In detailed, if a measured average SINR of a UE is lower than a first predetermined threshold, it is determined that the UE has a bad channel condition. The first predefined threshold is selected as following: The SINR lower than the first predefined threshold will make the UE unable to select a MCS with high spectrum efficiency (or low transmission number such as 2 times). If a maximum difference among measured average SINRs of a group of UEs is smaller than a second predetermined threshold, it is determined that the group of UEs have similar channel conditions. The second predefined threshold is typical value that the two UEs can use similar or same MCS and then will used same number of resource units for the grouped UEs.

Step 204 is a packet transmission step in which each UE will use its corresponding time slot to transmit its packets. As shown in the sub-flowchart on the right, at step 2041, packets from one UE are allocated to share the allowable maximum transmission times of the HARQ processes within the corresponding time slot allocated to the one UE in its group. At step 2043, a packet is transmitted or retransmitted dependent on the success or failure of its previous packet transmission. At step 2045, it is determined whether the current packet transmission is successful or not. If the current packet is successfully transmitted ("Yes" at step 2045), the process flow goes back to step 2043 in which a next packet is transmitted. Otherwise, if it is determined that the current packet transmission is not successful ("No" at step 2045), then at step 2047 it is determined whether at least one retransmission process is still possible within the corresponding time slot allocated to the one UE. If so ("Yes" at step 2047), it goes back to step 2043 in which the current packet is retransmitted. Otherwise ("No" ate step 2047), at step 2049, it is determined to discard the current packet and any other remained packets.

In the present invention, frequency resource (RU number) and a modulation coding scheme for the one UE may be kept unchanged all the time. Alternatively, frequency resource (RU number) and a modulation coding schemes for the one UE or the UEs' group may be changed according to a measured SINR of the one UE or the measured average SINR among all UEs in the UEs' group.

Additionally, for those grouped UEs, the predetermined set of criteria on communication conditions may further include at least one of the followings:

an average PER of the user equipments in the user equipment group during a predefined measurement period is no larger than a first threshold A; and an average unused HARQ transmission times persistently granted to the UE group is lower than a second threshold B.

So that, if those grouped UEs can not satisfy the above criteria, then one grouped UE will be removed from the UE group; otherwise, if the above criteria can be satisfied, another UE may be added into the UE group.

Additionally, for those non-grouped UEs, the predetermined set of criteria on communication conditions may further include at least one of the followings:

an average PER of the UEs in the one UE group during a predefined measurement period is no larger than the first threshold A; and an average used number of retransmission processes in the one UE group is no larger than a third threshold C.

So that, if it is determined that those grouped UEs satisfy the above criteria, one UE from those non-grouped UEs may be added into one UE group satisfying the above criteria.

Figure 2B:
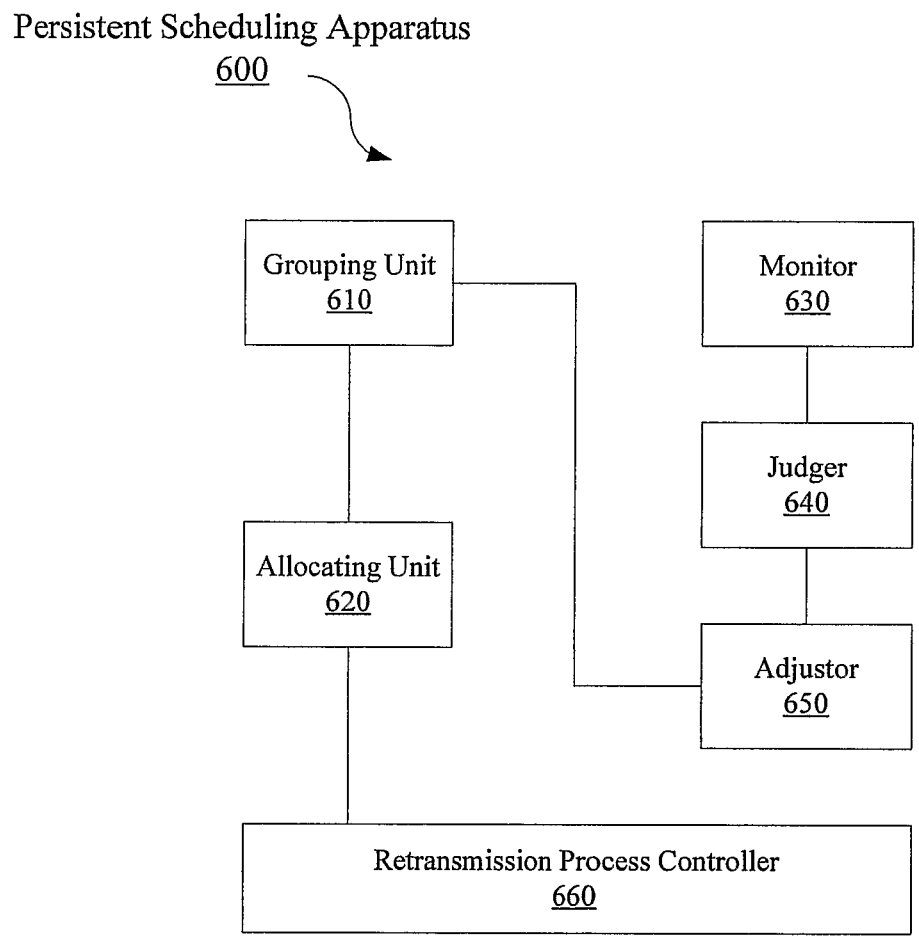
FIG. 2b shows a block diagram of the persistent scheduling apparatus according to the present invention.

FIG. 2b shows a block diagram of the persistent scheduling apparatus according to the present invention.

As shown in FIG. 2b, the persistent scheduling apparatus 600 according to the present invention includes a grouping unit 610 for grouping a predetermined number of UEs into a UE group to share retransmission processes in different time slots each having a predetermined size, according to a predetermined set of criteria on communication conditions; and an allocating unit 620 for allocating each UE within one UE group to use a corresponding time slot in a time division multiplexing mode. Therefore, each UE will use its corresponding time slot to transmit its packets.

Furthermore, the persistent scheduling apparatus 600 further includes: a monitor 630 for monitoring the communication conditions of all the UEs periodically; a judger 640 for determining whether or not the predetermined number of UEs previously grouped into one UE group still satisfy the predetermined set of criteria on communication conditions, and for determining whether or not another UE currently satisfies the predetermined set of criteria on communication conditions; and an adjustor 650 for adjusting those UEs not satisfying the predetermined set of criteria on communication conditions any longer out of the UE group, and for adjusting those UEs currently satisfying the predetermined set of criteria on communication conditions into the use equipment group.

As described above, the predetermined set of criteria on communication conditions at least includes:

the UE is in a talk state;

the UE does not have a bad channel condition; and those UEs to be grouped into one UE group have similar channel conditions.

Similarly, if a measured average SINR of a UE is lower than a first predetermined threshold, it is determined that the UE has a bad channel condition. If a maximum difference among measured average SINRs of a group of UEs is smaller than a second predetermined threshold, it is determined that the group of UEs have similar channel conditions.

The persistent scheduling apparatus 600 further includes: a retransmission process controller 660 for allocating packets from one UE to share the allowable maximum transmission times of the HARQ processes within the corresponding time slot allocated to the one UE. The retransmission process controller 660 is further used to retransmit a packet from the one UE failed to be transmitted/retransmitted if at least one retransmission process is still possible within the corresponding time slot allocated to the one UE; and to discard the packet from the one UE failed to be transmitted/retransmitted and any other remained packets from the one UE if no retransmission process is possible within the corresponding time slot allocated to the one UE.

According to the present invention the retransmission process controller may keep frequency resource (RU number) and a modulation coding scheme for the one UE unchanged all the time, or alternatively, the retransmission process controller 600 may change frequency resource (RU number) and a modulation coding schemes for the one UE according to a measured SINR of the one UE.

Additionally, for those grouped UEs, the predetermined set of criteria on communication conditions may further include at least one of the followings:

an average PER of the user equipments in the user equipment group during a predefined measurement period is no larger than a first threshold A; and an average unused HARQ transmission times persistently granted to the UE group is lower than a second threshold B.

So that, if those grouped UEs can not satisfy the above criteria, then the adjustor will remove one grouped UE from the UE group.

Additionally, for those non-grouped UEs, the predetermined set of criteria on communication conditions may further include at least one of the followings:

an average PER of the UEs in the one UE group during a predefined measurement period is no larger than the first threshold A; and an average used number of retransmission processes in the one UE group is no larger than a third threshold C.

So that, if the judger 640 determines that those grouped UEs satisfy the above criteria, the adjustor 650 may add one UE from those non-grouped UEs into one UE group satisfying the above criteria.

In the following, the present invention will be described in further details by referring to FIGS. 3 and 4.

Figure 3:
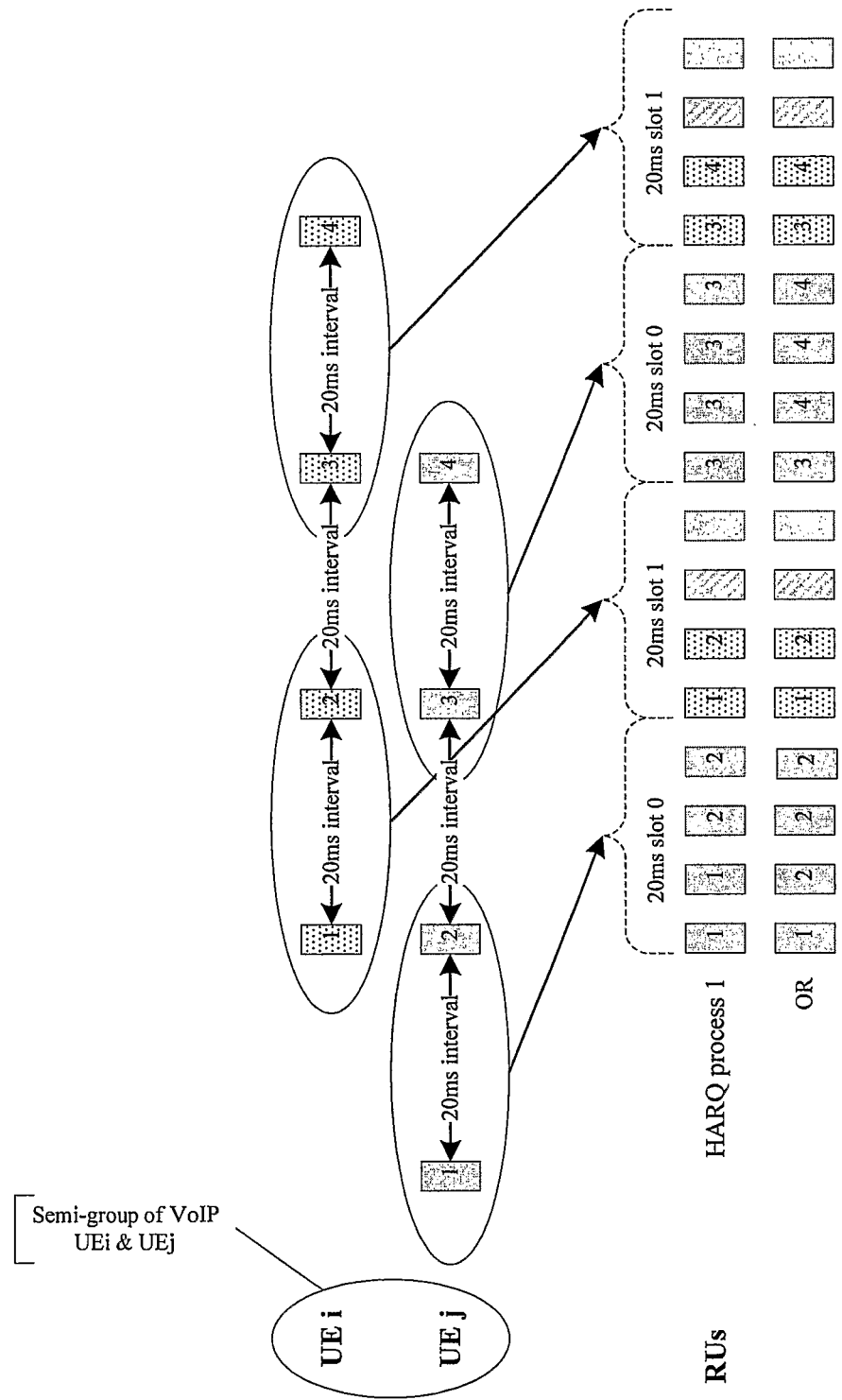
FIG. 3 is a schematic diagram to illustrate an example for semi-grouping for persistent VoIP scheduling.

FIG. 3 is a schematic diagram to illustrate an example for semi-grouping for persistent VoIP scheduling.

As shown in FIG. 3, different VoIP users (UEi and UEj) are semi-grouped together during their talk spurts (based on the talk request) using Radio Resource Control (RRC) signaling. Then VoIP packets 1 and 2 from UEi and UEj share the same HARQ process in one frame. UEi and UEj are sharing the different time frames using TDM mode.

The criteria that multiple VoIP users are semi-grouped together are:

The VoIP users are in the talk state

The VoIP users are not in the very bad channel conditions, i.e., if the measured average SINR of VoIP user is very low, it will transmit many times (e.g., large than 3 times) even with lowest available MCS.

The VoIP users have similar channel conditions, i.e., the average measured SINR is close to choose the same MCS for them, so that the VoIP users may use same number of resource units In the example of FIG. 3, UEi and UEj group two VoIP frames (frame 1 and frame 2) and share the RUs in the HARQ process 1. In addition, the two UEs (UEi and UEj) alternatively share the time resources such as the 20 ms slot 0 is used by UEi and 20 ms slot 1 is used by UEj.

Within each 20 ms slot (e.g., slot 0), the two VoIP packets from UEi share the HARQ transmissions (e.g., 4 transmissions). Their sharing could be: (a) Both VoIP packets 1 and 2 from UEi are transmitted 2 times or (b) packet 1 is transmitted 1 time and packet 2 is transmitted 3 times. Thus the two VoIP packets within same VoIP UEs can realize the statistical multiplexing for HARQ process resource in time domain. Since the whole 20 ms slot (e.g., slot 0) is reserved for same UEi and thus no need for any dynamic grant. In the 3rd 20 ms slot, if packet 3 will be transmitted 4 times then packet 4 will lose the chance to get transmitted, this will be very low probability since the probability to need 3 transmissions is much less than 10% and two packets both need more than 3 transmissions is even much less than 10%*10%=1% which is low than the QoS requirement on packet error ratio of 2% for VoIP service. In addition, there will be slow mechanism to re-group the UEs if a sufficient packet error ratio is observed.

With consideration that the maximum delay requirement of VoIP service (e.g., 50 ms) and the average transmission number of VoIP packets (e.g., dynamically controlled by outer-loop control) limit the number of VoIP users in the semi-grouping such as:

If the maximum delay of VoIP is 50 ms: typically two VoIP UEs can be semi-grouped;

VoIP packets per 40 ms are combined to send in one 20 ms window, two VoIP UEs use the time resource of 20 ms window alternately at TDM. This will bring maximum 40 ms delay for VoIP packet which satisfy the QoS requirement of VoIP service.

If average transmission number of VoIP packets is large than 2 times such as in bad channel condition (to be avoided in dynamic resource selection), then there is no need to group the VoIP packets to share the HARQ process since this VoIP packet itself will highly use the HARQ retransmission chances.

The number of packets (size=number of UEs in the semi-group) statistically share the maximum transmission times (e.g., 4 transmissions) in the same HARQ process within each time slot and thus to leverage the unused HARQ retransmission resource (e.g., improve resource utilization from 50% to 100% if each packet is only transmitted 2 times by average). This brings the benefits that there is no need for fast dynamic L1 signaling to coordinate the VoIP packet transmission among different VoIP users.

For the multiple VoIP packets from the same VoIP user, the HARQ process resource will be used to guarantee the first VoIP packet transmission until it reaches the maxim transmission number. Then follow the next VoIP packet transmission.

It needs to semi-statically re-adjust the size of semi-grouping to trade-off the outage probability and VoIP capacity. In addition, when one VoIP user leaves semi-group (due to entering into the silence state) or newly enters talk state, it should be semi-statically re-grouped with other VoIP users by using L3 signaling.

There introduces outer loop control to re-adjust the semi-group size of VoIP users. This control loop will measure the average packet error ratio (PER) of the VoIP users in the semi-group within defined measurement period. If the average PER is larger than the preconfigured threshold A (e.g., PER>2% from QoS requirement of VoIP service) or if an average unused HARQ transmission times persistently granted to the UE group is lower than a second threshold B, one VoIP user will be removed from the semi-group; otherwise, if the average PER of the VoIP users in the semi-group satisfy the preconfigured threshold A and the average of total used HARQ transmission number is lower than threshold C (e.g., 3 times), then one VoIP user can be added in the semi-group.

For simplicity, here we suggest to semi-group UEs with similar channel condition. However, since different VoIP users only share the HARQ process resource in different time slots and thus it is not necessary for them to have similar average SINR values. For this case, it is required to uniformly distribute the semi-groups of VoIP users in the time domain.

Figure 4:
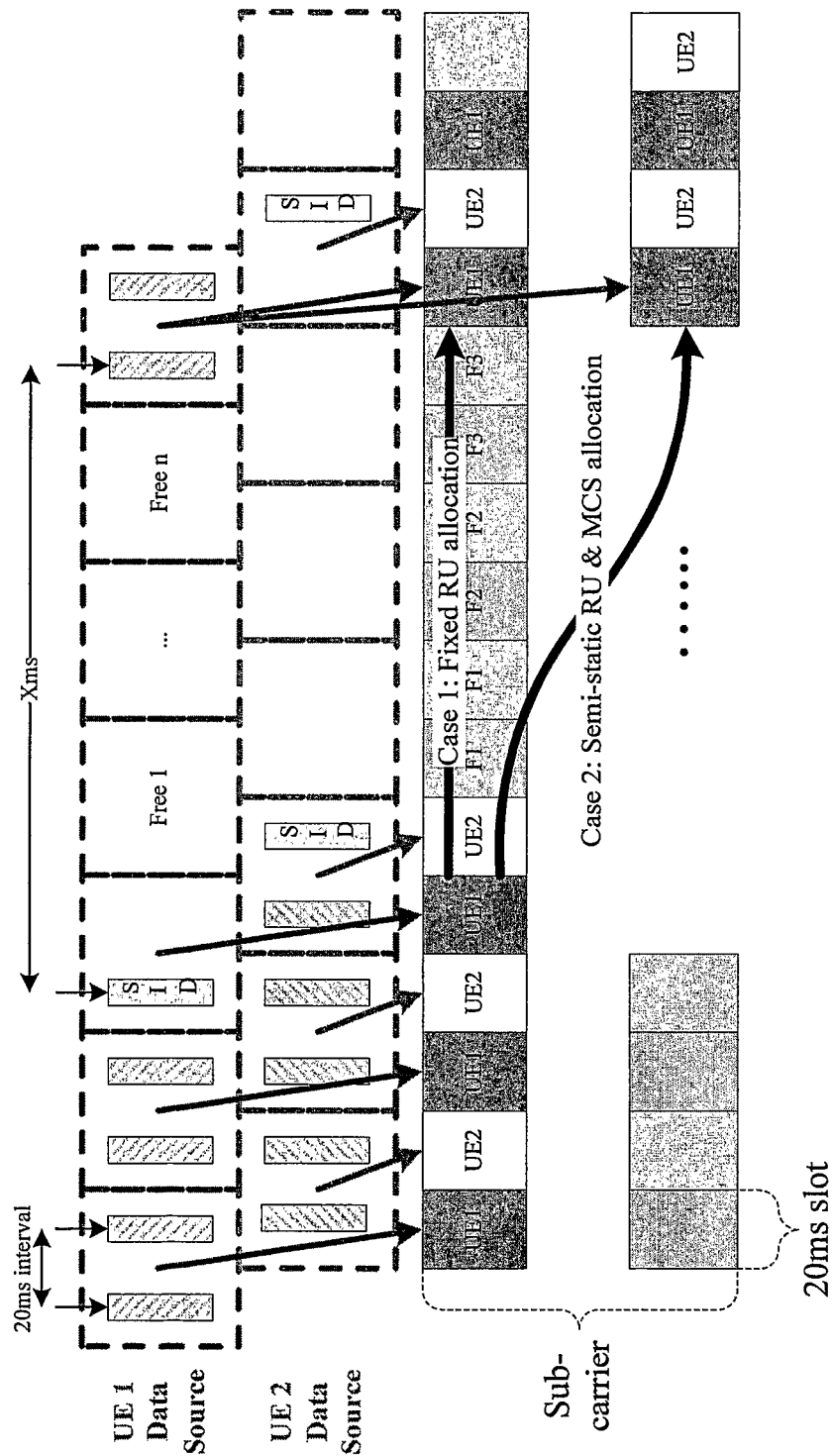
FIG. 4 is a schematic diagram to illustrate an example for semi-grouping with static or semi-static resource allocation.

FIG. 4 is a schematic diagram to illustrate an example for semi-grouping with static or semi-static resource allocation.

As shown in FIG. 4, in frequency-domain, the semi-static resource allocation can also be applied according to the slowly varying channel condition.

In FIG. 4 which shows two VoIP UEs (e.g., UE1 and UE2), the VoIP packets in each UE are semi-statistically grouped together to share the RUs in the same HARQ process and the two UEs (UE1 and UE2) statistically share the time resources as described in FIG. 3. This figure additionally illustrates that the frequency resource in term of number of RUs, and the modulation and coding scheme (MCS) for the VoIP packet transmission can be slowly changed according the slow-varying channel condition of the VoIP UE.

In Case 1, all the RUs and MCS are fixed for simplicity, but in Case 2, both are changed semi-statically to further improve the VoIP capacity.

In detailed, in Case 1, the UE1 and UE2 are semi-grouped together and they are allocated the time resource (20 ms time slot) alternatively. For each UE, two VoIP packets are sharing the maximum 4 transmissions within each frame (20 ms time slot). There is no channel-aware scheduling introduced and thus the frequency resource (RU number) and MCS keeps unchanged for both UE1 and UE2's VoIP to packet transmission.

On the other hand, in Case 2, the slow channel-aware scheduling is introduced and thus both the RU number and MCS are changed according to the measured SINR for UE1 and UE2. This can further improve the VoIP capacity.

Since the grouping is semi-static and thus fast channel frequency-selectiveness can't be fully leveraged, however, the fast frequency fading diversity can be smoothed through statistically sharing the same HARQ for 2 packets in one VoIP UE for each user.

3. Preliminary Simulation Results

Simulation Scenarios:

Single cell, 5 MHz BW(24RUs), Codec 12.2 Kbps, Case 1 in FIG. 4 with TU6 channel, 5 HARQ process and 4 maximum Tx Number, 1 ms TTI Features in Enhanced Persistent Scheduling in Simulations
SID detections
  Dynamic RU selection and Non-channel aware: Select different RU index but fixed RU number and MCS: 2 RUs X QPSK ½ for each VoIP packet
  Semi-grouping (TDM)
Features in Dynamic Group Scheduling:
  From Motorola [Reference 1]: a group of UEs share a set of RUs for HARQ process
  Fixed 2 RUs X QPSK ½ for each VoIP packet
  Per TTI bitmap L1/L2 signaling (bits=number of UEs within each group) to reuse the silence and unused HARQ transmission (Apply our SID detection)

Figure 5A:
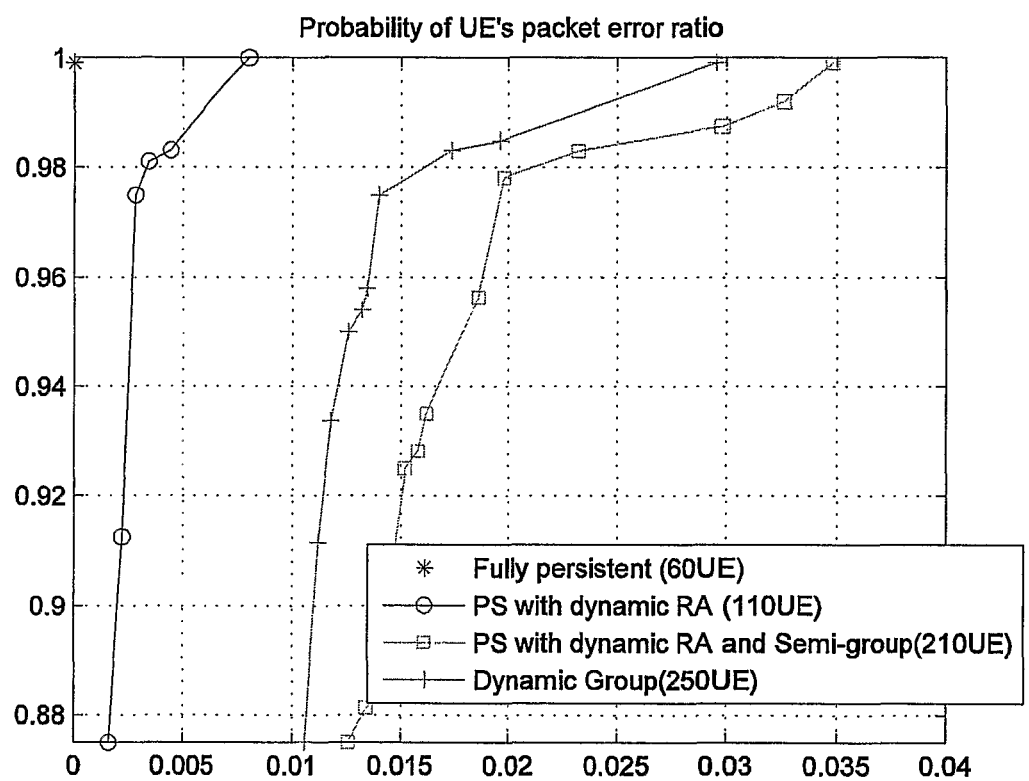
FIGS. 5a and 5b show the graphs obtained from preliminary simulation according to the present invention and the prior arts.
Figure 5B:
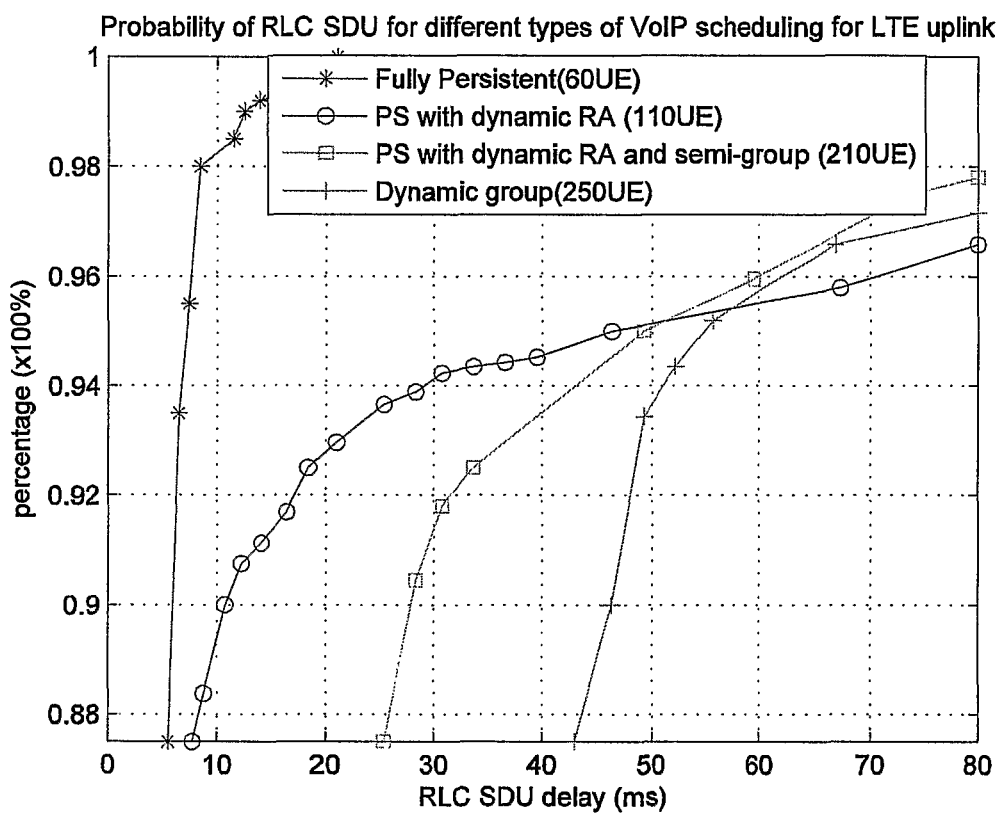

FIGS. 5a and 5b show the simulation results in which FIG. 5a shows a graph illustrating the packet error ratio of VoIP packets in different approaches, and FIG. 5b shows a graph illustrating the RLC SDU delay of VoIP packets in different approaches.

In FIG. 5a and FIG. 5b, the QoS of VoIP packets are shown for different schemes. With the semi-grouping method, we can find the VoIP capacity can be increased by from 110 UEs to 210 UEs and it proves the efficiency of semi-grouping method for persistent VoIP scheduling. There is little gap (250 UEs can't satisfy the QoS requirement for pure dynamic scheduling method with significant dynamic grant) compared persistent scheduling using semi-grouping method with purely dynamic scheduling method but with benefits of no dynamic grant at all for enhanced persistent scheduling.

The criteria of VoIP QoS is: 5% outage based on users having <98% of its speech frames delivered successfully within 50 ms (PER<2%).

From the above system simulations, we can find that the enhancement of semi-grouping can bring
  Fully persistent can support up to 60 UEs (=5*12) and shows satisfying packet delay and PER
  Dynamic group scheduling shows largest capacity (250 UEs with 95% RLC SDU delay <60 ms && 95% PER <2%) but needs a large number of DL grant costs (50 dynamic grants per TTI). This dynamic group is rejected in 3GPP.
  Enhanced persistent scheduling can also show significant capacity gain (210 UEs with 95% RLC SDU delay <50 ms && 95% PER <2%) vs. 110
  Semi-grouping (TDM) can achieve additional 91% gain vs. w/o semi-grouping persistent scheduling
  RRC signaling is per UE and thus linearly increased with the real connected VoIP UEs The above embodiments are provided for the purpose of example only, and are not intended to limit the present invention. It is to be understood by those skilled in the art that there may be various modifications or replacements to the embodiments without departing from the scope and the spirit of the present invention, and they shall fall into the scope defined by the appended claims.

REFERENCE LIST

Reference 1: 3GPP TS36.300
Reference 2: R2-070908 Group scheduling E-UTRA VoIP, Motorola;
Reference 3: R2-072667 Efficient Persistent UL Scheduling and HARQ Feedback Usage, Alcatel-Lucent

What is claimed is:

1. A persistent scheduling method based on user equipment semi-grouping and statistically multiplexing, comprising steps of:
  grouping a predetermined number of user equipments into a user equipment group to share allowable maximum transmission times of retransmission processes in different time slots each having a predetermined size, said grouping occurring according to a predetermined set of criteria on communication conditions such that each of the user equipments grouped together meet the same criteria;
  removing at least one user equipment from the user equipment group if an average packet error ratio of the user equipments in the user equipment group during a predefined measurement period is larger than a first threshold; and
  allocating each user equipment within the user equipment group to use a corresponding time slot in a time division multiplexing mode.

2. The persistent scheduling method according to claim 1, further comprising steps of:
  monitoring the communication conditions of all the user equipments periodically;
  determining whether or not the predetermined number of user equipments previously grouped into the user equipment group still satisfy the predetermined set of criteria on communication conditions, and determining whether or not another user equipment currently satisfies the predetermined set of criteria on communication conditions; and
  adjusting the user equipments not satisfying the predetermined set of criteria on communication conditions any longer out of the user equipment group, and adjusting the user equipments currently satisfying the predetermined set of criteria on communication conditions into the user equipment group.

3. The persistent scheduling method according to claim 1, wherein the predetermined set of criteria on communication conditions at least includes:
  a state of each user equipment, wherein the state is alternatively a talk state in which packets are transmitted from the user equipment at a first rate or a silence state in which packets are transmitted from the user equipment at a second rate that is slower than the first rate;
  the user equipment does not have a bad channel condition; and
  the user equipments to be grouped into the user equipment group have similar channel conditions to one another.

4. The persistent scheduling method according to claim 1, further comprising a step of:
  allocating packets from each user equipment to share the allowable maximum transmission times of the retransmission processes within the corresponding time slot allocated to each user equipment.

5. The persistent scheduling method according to claim 1, wherein for non-grouped user equipments, the predetermined set of criteria on communication conditions further includes at least one of:
  an average packet error ratio of the user equipments in the user equipment group during a predefined measurement period is no larger than a first threshold; and
  an average used number of retransmission times in the user equipment group is no larger than a third threshold.

6. A persistent scheduling apparatus based on user equipment semi-grouping and statistically multiplexing, comprising:
  a grouper that groups a predetermined number of user equipments into a user equipment group to share allowable maximum transmission times of retransmission processes in different time slots each having a predetermined size, said grouping occurring according to a predetermined set of criteria on communication conditions such that each of the user equipments grouped together meet the same of criteria;

an adjustor that removes at least one user equipment from the user equipment group if an average packet error ratio of the user equipments in the user equipment group during a predefined measurement period is larger than a first threshold; and an allocator that allocates each user equipment within the user equipment group to use a corresponding time slot in a time division multiplexing mode.

7. The persistent scheduling apparatus according to claim 6, further comprising:

a monitor that monitors the communication conditions of all the user equipments periodically; and a judger that determines whether or not the predetermined number of user equipments previously grouped into the user equipment group still satisfy the predetermined set of criteria on communication conditions, and for determining whether or not another user equipment currently satisfies the predetermined set of criteria on communication conditions;

wherein said adjustor further operates to adjust the user equipments not satisfying the predetermined set of criteria on communication conditions any longer out of the user equipment group, and adjust the user equipments currently satisfying the predetermined set of criteria on communication conditions into the user equipment group.

8. The persistent scheduling apparatus according to claim 6, wherein the predetermined set of criteria on communication conditions at least includes:

a state of each user equipment, wherein the state is alternatively a talk state in which packets are transmitted from the user equipment at a first rate or a silence state in which packets are transmitted from the user equipment at a second rate that is slower than the first rate;

the user equipment does not have a bad channel condition; and the user equipments to be grouped into the user equipment group have similar channel conditions to one another.

9. The persistent scheduling apparatus according to claim 6, further comprising:

a retransmission process controller that allocates packets from each user equipment to share the allowable maximum transmission times of retransmission processes within the corresponding time slot allocated to each user equipment.

10. The persistent scheduling apparatus according to claim 6, wherein for non-grouped user equipments, the predetermined set of criteria on communication conditions further includes at least one of:

an average packet error ratio of the user equipments in the user equipment group during a predefined measurement period is no larger than a first threshold; and an average used number of retransmission times in the user equipment group is no larger than a third threshold.

\* \* \* \* \*